(12) United States Patent
Salazar et al.

(10) Patent No.: US 11,787,013 B2
(45) Date of Patent: Oct. 17, 2023

(54) SEPARATION DEVICE FOR COATING BLASTING AND COATING STRIPPING BOOTHS

(71) Applicant: GIFFIN, INC., Auburn Hills, MI (US)

(72) Inventors: Abraham J. Salazar, Lake Orion, MI (US); Donald A. Cook, Shelby Township, MI (US)

(73) Assignee: GIFFIN, INC., Auburn Hills, MI (US)

( * ) Notice: Subject to any disclaimer, the term of this patent is extended or adjusted under 35 U.S.C. 154(b) by 595 days.

(21) Appl. No.: 16/634,005

(22) PCT Filed: Jul. 27, 2018

(86) PCT No.: PCT/US2018/044127
§ 371 (c)(1),
(2) Date: Jan. 24, 2020

(87) PCT Pub. No.: WO2019/023600
PCT Pub. Date: Jan. 31, 2019

(65) Prior Publication Data
US 2020/0206873 A1      Jul. 2, 2020

Related U.S. Application Data

(60) Provisional application No. 62/569,684, filed on Oct. 9, 2017, provisional application No. 62/537,688, filed on Jul. 27, 2017.

(51) Int. Cl.
*B24C 9/00* (2006.01)
*B24C 1/08* (2006.01)
(Continued)

(52) U.S. Cl.
CPC .............. *B24C 9/006* (2013.01); *B24C 9/003* (2013.01); *B24C 1/086* (2013.01); *B24C 3/04* (2013.01); *B24C 7/0046* (2013.01); *B24C 11/00* (2013.01)

(58) Field of Classification Search
CPC ......... B24C 9/006; B24C 9/003; B24C 11/00; B24C 9/00; B07B 4/02; B07B 7/01; B07B 7/04
(Continued)

(56) References Cited

U.S. PATENT DOCUMENTS 1,511,025 A * 10/1924 Christoph .............. B24C 9/006
                                                       451/89
1,692,948 A * 11/1928 Moore .................... B24C 9/003
                                                       451/88
(Continued)

OTHER PUBLICATIONS

International Search Report and Written Opinion of PCT/US2018/044127, dated Sep. 26, 2018.

*Primary Examiner* — Don M Anderson
*Assistant Examiner* — Sarah Akyaa Fordjour
(74) *Attorney, Agent, or Firm* — DICKINSON WRIGHT PLLC

(57) ABSTRACT

A blasting or stripping booth is provided creating a generally downward flow for treatment of fluid and particle flow, which reduces operator exposure to potentially hazardous debris. The booth comprises an enclosure defining an upper region for a workpiece, a lower region, and a separator assembly. In some instances the separator assembly includes individual separator units which are discrete units, each having a generally square or rectangular plan view configuration which are arranged in an array for providing the required process flow capabilities. Further embodiments utilize structures forming the separator which have an elongated trough-like configuration. These embodiments find a particular application in large-scale stripping or blasting booth used in production environments where workpieces may flow through a treatment system in a serial manner. Other suitable applications include batch type processing of parts.

12 Claims, 14 Drawing Sheets

(51) Int. Cl.
*B24C 3/04* (2006.01)
*B24C 7/00* (2006.01)
*B24C 11/00* (2006.01)

(58) Field of Classification Search
USPC .............................................. 451/89, 88, 99
See application file for complete search history.

(56) References Cited

U.S. PATENT DOCUMENTS

| | | | | |
|---|---|---|---|---|
| 4,221,655 A | * | 9/1980 | Nakayama | B01D 45/12 |
| | | | | 96/372 |
| 4,409,009 A | | 10/1983 | Lissy | |
| 5,035,089 A | | 7/1991 | Tillman et al. | |
| 5,107,632 A | * | 4/1992 | Stern | B07B 7/02 |
| | | | | 451/92 |
| 5,165,549 A | | 11/1992 | Kanda et al. | |
| 6,269,955 B1 | | 8/2001 | Morimoto et al. | |

* cited by examiner

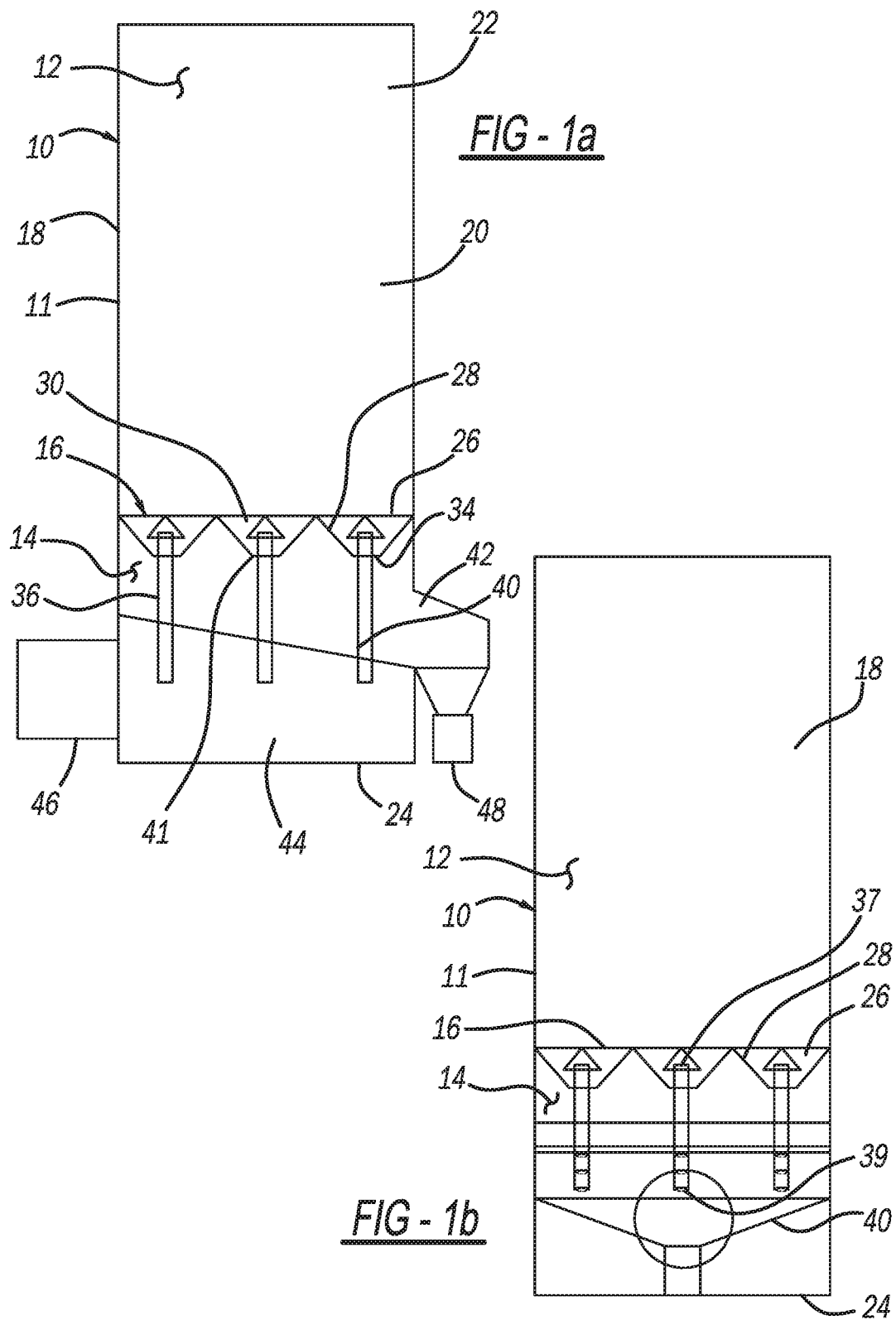

SEPARATION DEVICE FOR COATING BLASTING AND COATING STRIPPING BOOTHS

CROSS-REFERENCE TO RELATED APPLICATIONS

This application is a 35 U.S.C. § 371 national phase of PCT International Application No. PCT/US2018/044127, filed Jul. 27, 2018, which claims the benefit of priority under 35 U.S.C. § 119 to U.S. Provisional Application Nos. 62/537,688, filed Jul. 27, 2017, and 62/569,684, filed Oct. 9, 2017, the contents of which are incorporated herein by reference in their entirety.

FIELD OF THE INVENTION

This invention relates to a separation device that may be used to separate blasting media from air and waste material for use in coating/blasting and coating/stripping booths.

BACKGROUND AND SUMMARY OF THE INVENTION

In some commercial and industrial operations it is necessary to treat products to remove surface finishes, clean surfaces, and strip off corrosion layers. In some instances, such processes are provided with newly manufactured components to properly finish surfaces for subsequent process steps such as painting, corrosion coating, plating, etc., which are collectively referred to here as blasting operations. In other instances, products which have been in service or were subjected to exposure or aging require surface coatings or corrosion to be removed such as rust and other forms of oxidation for further processing steps, referred to as a stripping operation. Such processes may be carried out in an open environment or in an enclosed blasting or stripping booth. Normally a high velocity stream of air is used having entrained blasting media which is directed to impinge on the workpiece surfaces. For enclosed processes, after the workpiece is treated it is usually necessary to separate the blasting media which may be of various types such as sand, beads, polymer bits, nut shells and various other materials referred to generally here as beads from air and the material removed from the part being processed which may include coating flakes, dirt, corrosion particles etc. collectively referred to as debris. So that the media can be recovered for reuse, a separation system is utilized. Ideally the beads can be recirculated and the debris can be separated for disposal. These systems can be used for blasting and stripping operations.

The present invention is related to a separation device for use in the above referenced applications.

SUMMARY

In accordance with the present invention, a number of embodiments of separator assemblies are disclosed which essentially create a generally downward stream of a mixture of air, debris and beads constituting a high solids concentration stream, which passes through a restricted flow area lower aperture. A secondary flow path is provided in which a flow stream moves in an upward direction, around a baffle, cone or hat structure to pass into a downwardly extending stream having a low concentration of entrained solids. The high solids concentration stream can be passed through downstream separation devices to reclaim beads and separate debris. Preferably the beads can be reused in a continuous closed-loop process. The low solids concentration stream can also be subjected to further downstream treatment such as using particulate filters or other separation devices to produce a stream of cleaned air with debris trapped for disposal or recycling. Booths in accordance with the present invention, by providing the generally downward flow through the treatment area provide distinct benefits over prior art booths in which the airflow has a substantial horizontal component. The generally downward flow and the treatment of the entirety of the fluid and particle flow through the booth reduces operator exposure to potentially hazardous debris.

Various embodiments of the invention are disclosed. In some instances the separator assembly includes individual separator units which are discrete units, each having a generally square or rectangular plan view configuration which are arranged in an array for providing the required process flow capabilities. Further embodiments utilize structures forming the separator which have an elongated trough-like configuration. These embodiments find a particular application in large-scale stripping or blasting booth used in production environments where workpieces may flow through a treatment system in a serial manner. Other suitable applications include batch type processing of parts.

DETAILED DESCRIPTION OF THE INVENTION

Figure 1C:
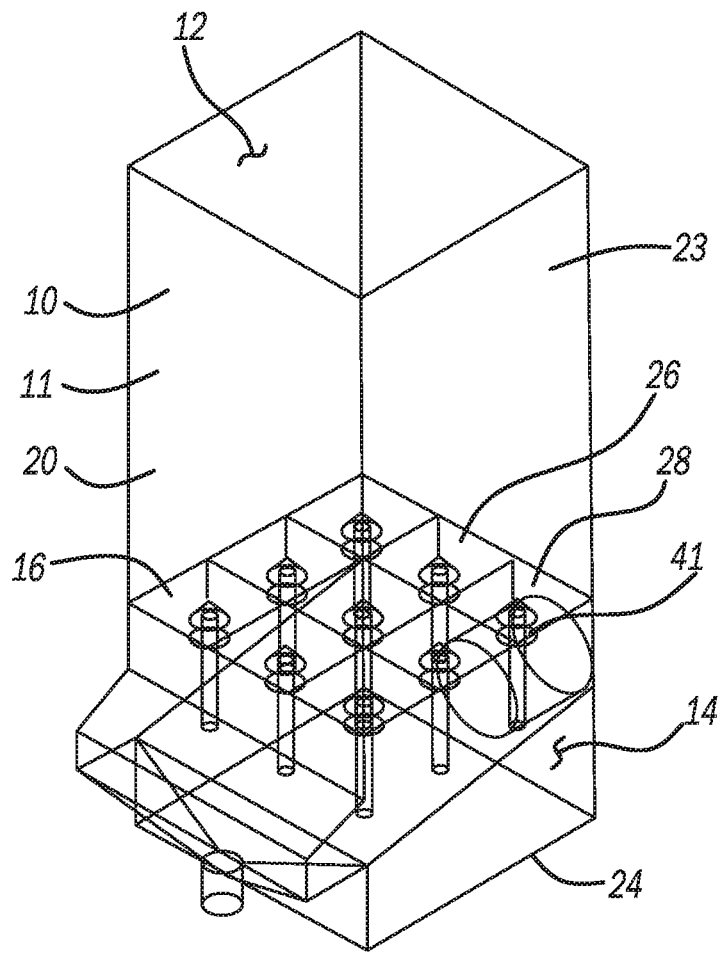
FIGS. 1a, b and c are respectively, front, side, and isometric views of a blasting or stripping booth incorporating a separator assembly in accordance with the present invention.

The invention will now be described with reference to the Figures. FIGS. 1a, b and c illustrate blasting or stripping booth 10 in accordance with the first embodiment which is provided as a generally rectangular cuboid enclosure 11 with an upper region 12 in which an article to be blasted (not shown) may be placed. An internally or externally manually operated blasting gun may be used to present a high velocity stream of air and blasting media (or generally "beads") against the workpiece being processed. In other applications, robotic systems are used to move a blasting nozzle to direct the blasting/stripping stream in a desired manner. Enclosure 11 is closed on all sides to create a controlled environment for treating the workpiece.

The lower region 14 of blasting or stripping booth 10 includes separator assembly 16 constructed in accordance with an embodiment of the present invention. In a commercial embodiment of booth 10 a grate or other structure would be provided in booth upper region 12 to support the workpiece, the operator and associated equipment. Such a grate (not shown) would be perforated to permit air and particle flow in a generally downward direction from the booth upper region 12 through the grate and into separator assembly 16.

Figure 2A:
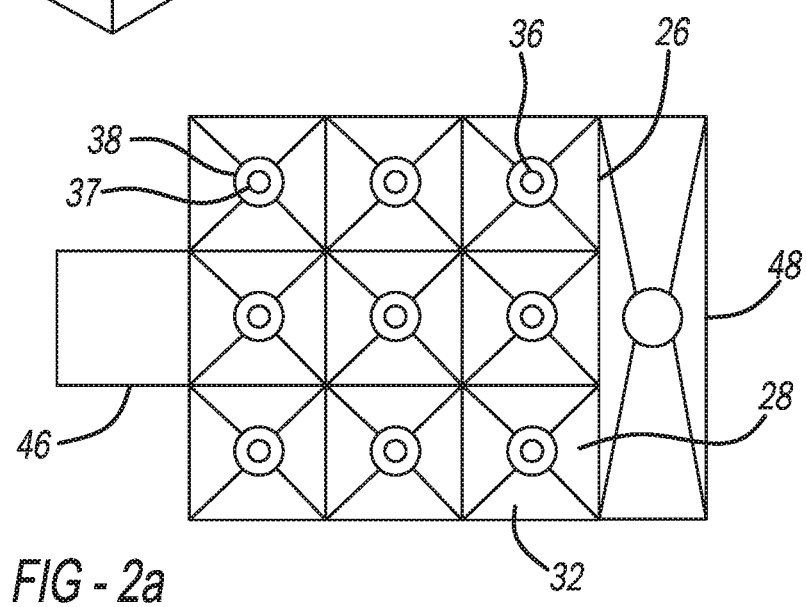
FIGS. 2a, b and c are respectively top and two isometric views of a separator assembly in accordance with the present invention.
Figure 2B:
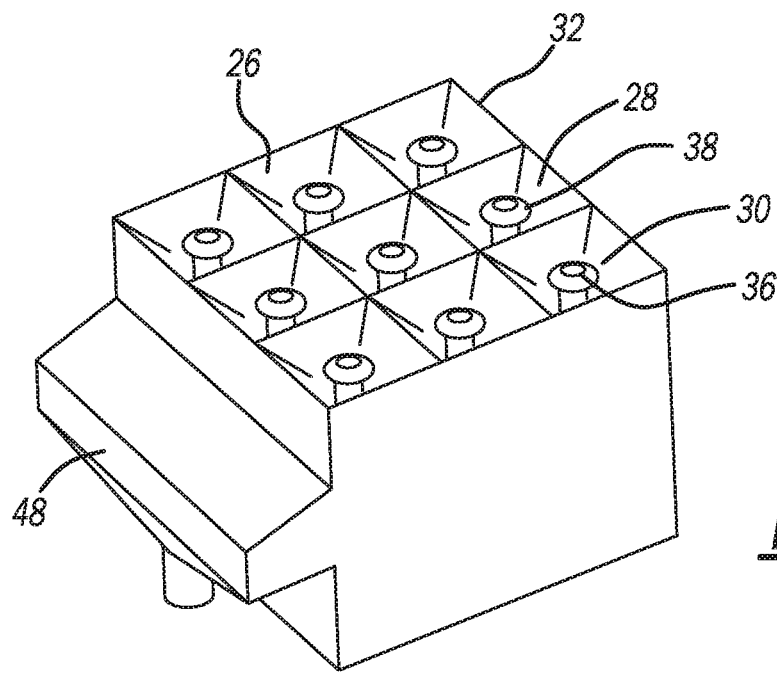
Figure 2C:
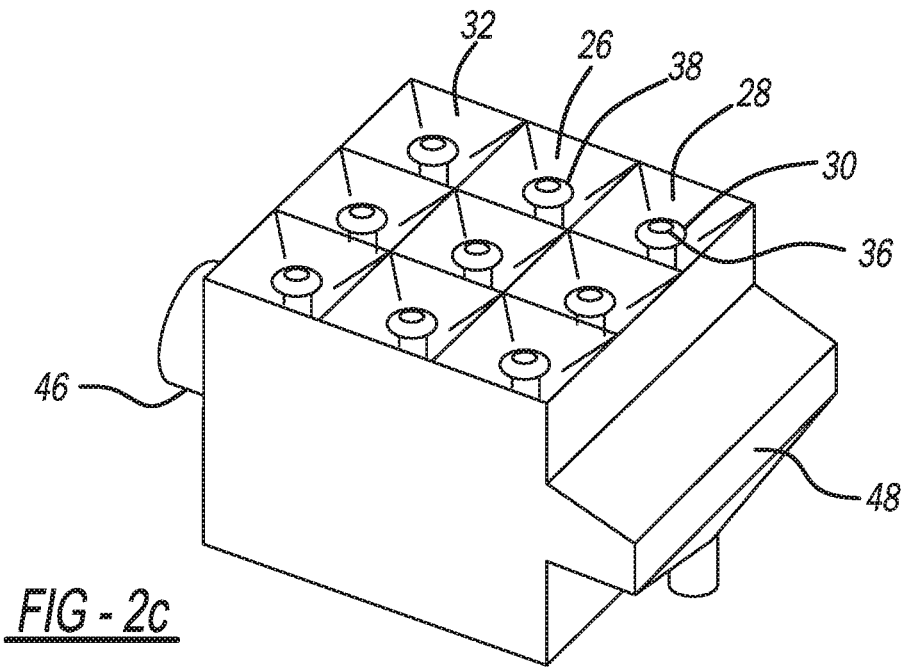

Separator assembly 16 is further illustrated by FIGS. 2a, b and c in more detail. Separator assembly 16 forms a generally rectangular cuboid outer surface including side walls 18, 20, 22 and 23, which are enclosed by bottom wall 24. Separator assembly 16 forms an array of generally vertical separator elements 26 arranged in an egg carton like 3×3 array, this being one example. Other array configurations (M×N) could be provided to accommodate any required area. The cross-sectional views through these separator elements 26 are provided with reference to FIGS. 1a and 1b. Each of the separator elements 26 shown for separator assembly 16 have a generally common configuration.

Figure 3:
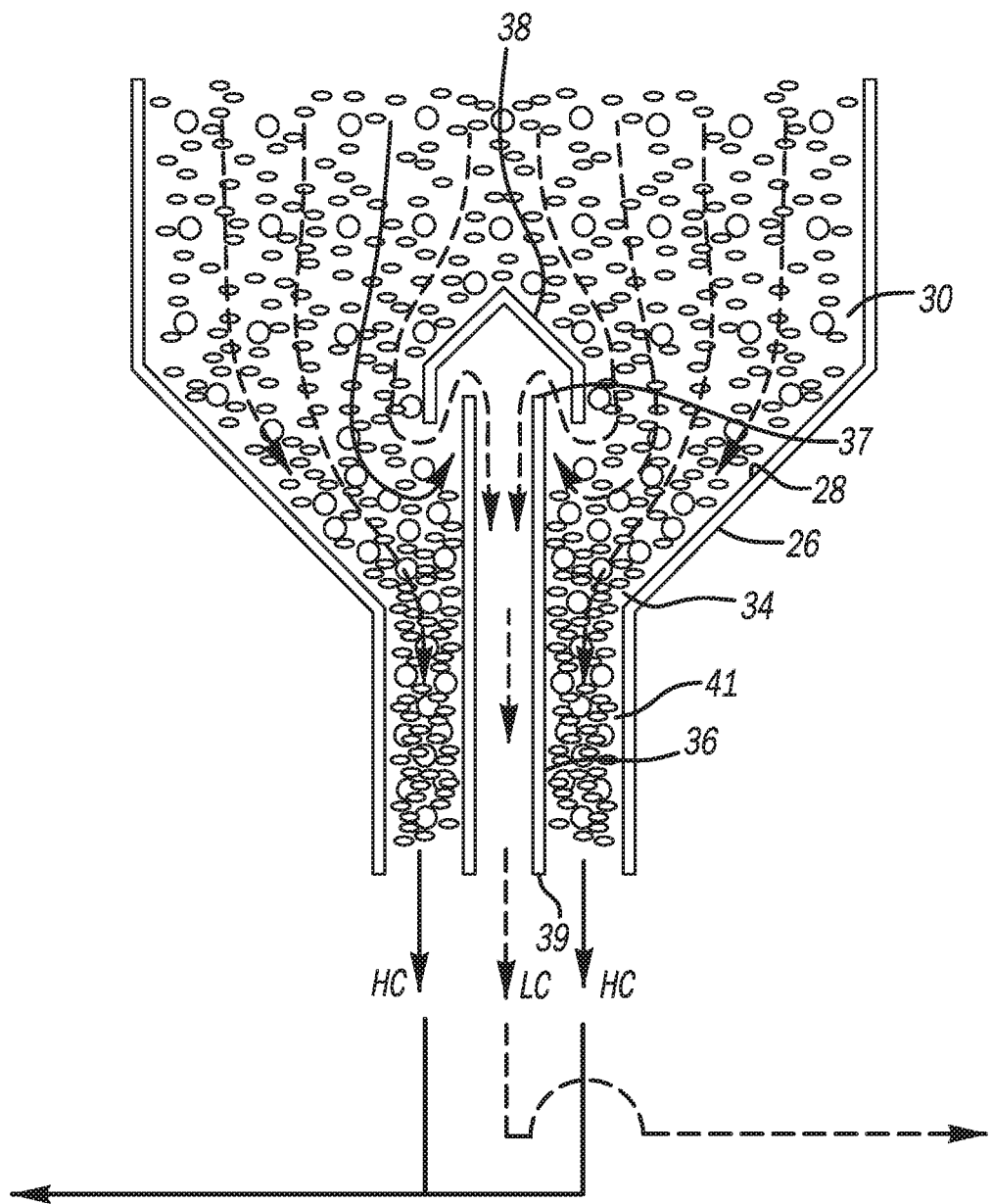
FIG. 3 is a schematic cross-sectional view of the separator assembly shown as a single discrete unit showing operational features.

Referring to a single separator element 26 shown in FIG. 3, each includes surrounding funnel wall 28 forming a converging cross-sectional area, for flow moving vertically downward. Funnel wall upper inlets 30 are each arranged to join at edges 32 bounding adjacent separator elements 26, or one of the side or end walls 18-23. Funnel wall 28 converges to lower aperture 34 at its lower end. Vertically extending concentrically within aperture 34 is a partition in the form of pipe 36, having upper and lower open ends, 37 and 39 respectively. Baffle 38 is positioned over pipe upper end 37 but is spaced from the pipe upper end to provide a flow passage under the baffle and into the pipe upper end 37. Lower aperture 34 is partly obstructed by the passage of pipe 36, but forms a generally annular passageway 41. For a number of embodiments described herein baffle 38 can be provided in various forms such as a hat structure, a cone, or a cover or any other structure which prevents the direct impingement of incoming flow into pipe upper end 37. These alternate forms are collectively referred to as a baffle.

Referring again to FIGS. 1a-c, partition wall 40 divides separator assembly 16 into an upper chamber 42 and lower chamber 44. Pipe 36 extends down into lower chamber 44, penetrating through or opening on the surface of wall 40. Lower chamber 44 communicates with separator air outlet 46. The upper chamber 44 above wall 40 is a plenum for separator air/solids outlet 48.

In describing the operation of separator assembly 16, reference is made to blasting media which may be of various types such as those mentioned previously, generally referred to as "beads". The beads, when contacting the workpiece, generate flakes or other particles of various sizes which are released by the workpiece, referred to here, generally as debris.

In operation of blasting or stripping booth 10, airflow is provided in a generally downward direction through booth 10 passing through upper region 12 and into separator 16. During the blasting or stripping operation, the beads impinge on the workpiece surface to be stripped or blasted, producing the debris. Accordingly, the downward flowing stream entering into separator assembly 16 is a mixture of air, beads, and debris. Separator assembly 16 is designed to provide a high solids concentration stream of beads and debris (referenced in the drawings as "HC") exiting at air/solids outlet 48, and a low solids concentration stream (referenced in the drawings as "LC") exiting from separator air outlet 46 which can be treated to remove entrained particulates for discharge.

FIG. 3 provides an illustration of the operation of separator assembly 16 showing a single separator element 26. In this illustration, beads are shown as small spheres, and debris is shown as oblong or ellipse shaped objects. Stream arrows illustrate the primary fluid flow directions of various streams within the separator element 26. For some flow stream components, the air/beads/debris stream impinges directly onto funnel wall 28 and is directed downwardly between the funnel wall and the outside of pipe 36 into the open annular passageway 41. This stream has a high concentration of solids (beads and debris). The flow stream of air/beads/debris stream segments which directly contact the upper surface of baffle 38 is deflected toward funnel wall 28 and is also concentrated into annular passageway 41 which forms an entry of a first passageway. Funnel wall 28 presents a decreasing flow area for the stream mixture so that the concentration of solids increases as the flow moves downwardly. Due to the relatively small flow area provided by annular passageway 41 and the high concentration of entrained solids, a high flow rate of air is restricted from flowing through the area. These flow passages communicate with upper chamber 42 for discharge through air/solids outlet 48. This stream is subjected to further downstream treatment for the separation of beads from debris. Preferably, the beads can be reused in a recycling continuous manner.

FIG. 3 also illustrates another stream of flow paths following a more tortuous path, moving initially downwardly and then upwardly in the annular region surrounding baffle 38 to enter into pipe upper end 37. This stream, due to the torturous flow path and the effects of gravity and inertia, once entering into baffle 38, tends to have a much lower solids concentration and is referred to here is a low solids concentration stream. This stream enters into pipe upper end 37 and flows through the pipe forming a second passageway into lower chamber 44. Flow from a number of separator elements 26 are joined together in lower chamber 44 for discharge from separator air outlet 46. Since this discharge has a low concentration of solids, it can be treated using filters or subsequent particulate separating devices to allow the discharge of process air or the recirculation of the cleaned air back into the blasting zone or booth.

Figure 4:
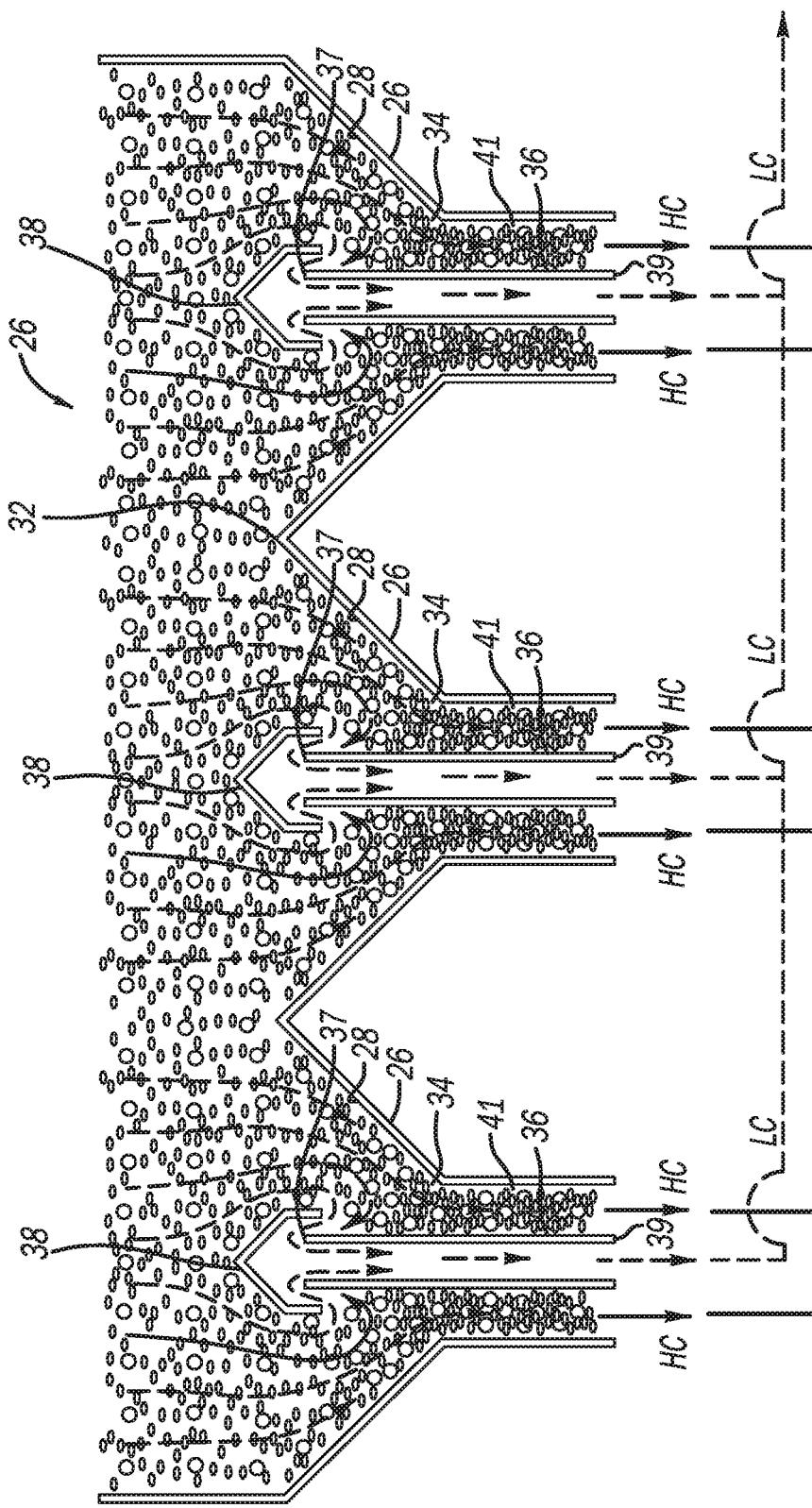
FIG. 4 is a schematic cross-sectional view of the separator assembly shown as operating in an array showing operational features.

FIG. 4 shows the joining of multiple units of separator elements 26 which corresponds more closely to the illustrations of FIGS. 1a-c and 2a-c. Each of the illustrated separator elements 26 operates in a manner consistent with that previously described with reference to FIG. 3.

The funnel walls 28 of separator elements 26 are illustrated in this description as having an essentially inverted square base pyramidal shape. Many other configurations may be used, such as triangular based pyramids or conical shapes. The invention may be carried out with others such shapes and structures which present a decreasing flow area for the flow mixture as it travels downwardly through the separator unit.

In the above-described embodiments of separator assembly 16, a number of discrete elements of the separator assembly are arranged in a rectangular array as previously explained. For these devices, baffles 38 are formed generally with rotational symmetry about a vertical axis passing through the pointed top of the cones and through the center of pipes 36. An alternate embodiment of the present invention is described with reference to FIGS. 5-7, referred to as separator assembly 60. Unlike the first embodiment, separator assembly 60 includes a number of elements which have a cross-section stretched in a linear manner, which may correspond to the direction of a conveyor passing through blasting booth 62. Other orientations are feasible such as perpendicular to the direction of the conveyor or other skewed relationships. Separator assembly 60 also differs from separator assembly 16 in that the first and second passageways for the high and low solids concentration streams respectively, rather than being concentric, are laterally displaced. In this case, the lower aperture of funnel wall 70 is not obstructed by a partition but instead a portion of the funnel wall laterally displaced from the lower aperture forms the partition for the second flow passageway for the low solids concentration stream. The funnel wall sections of adjacent separator elements joined together to form the second passageway, as best shown with reference to FIG. 5.

Figure 5:
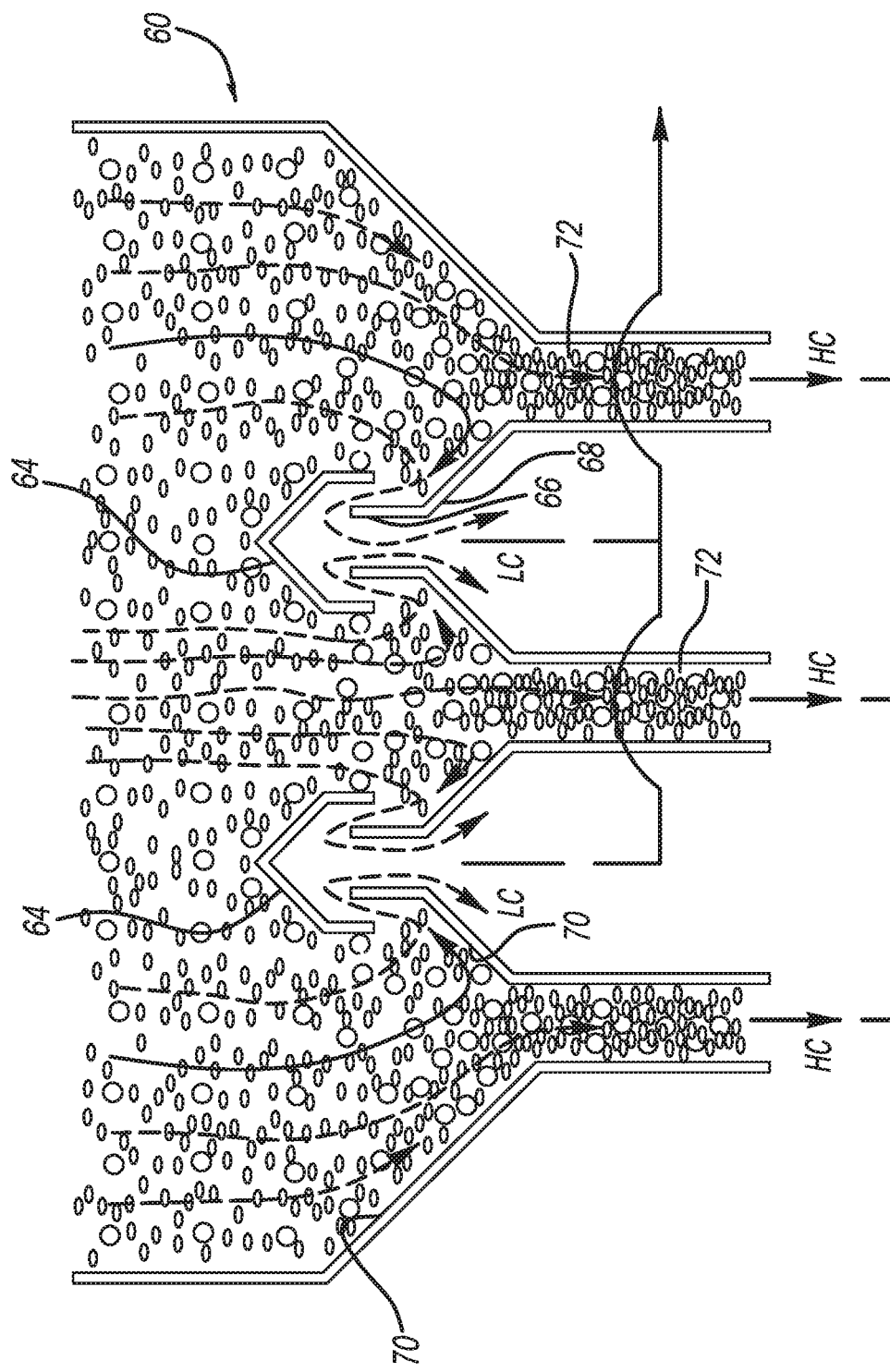
FIG. 5 is a schematic cross-sectional view of a separator assembly in accordance with an alternate embodiment of the present invention.
Figure 6:
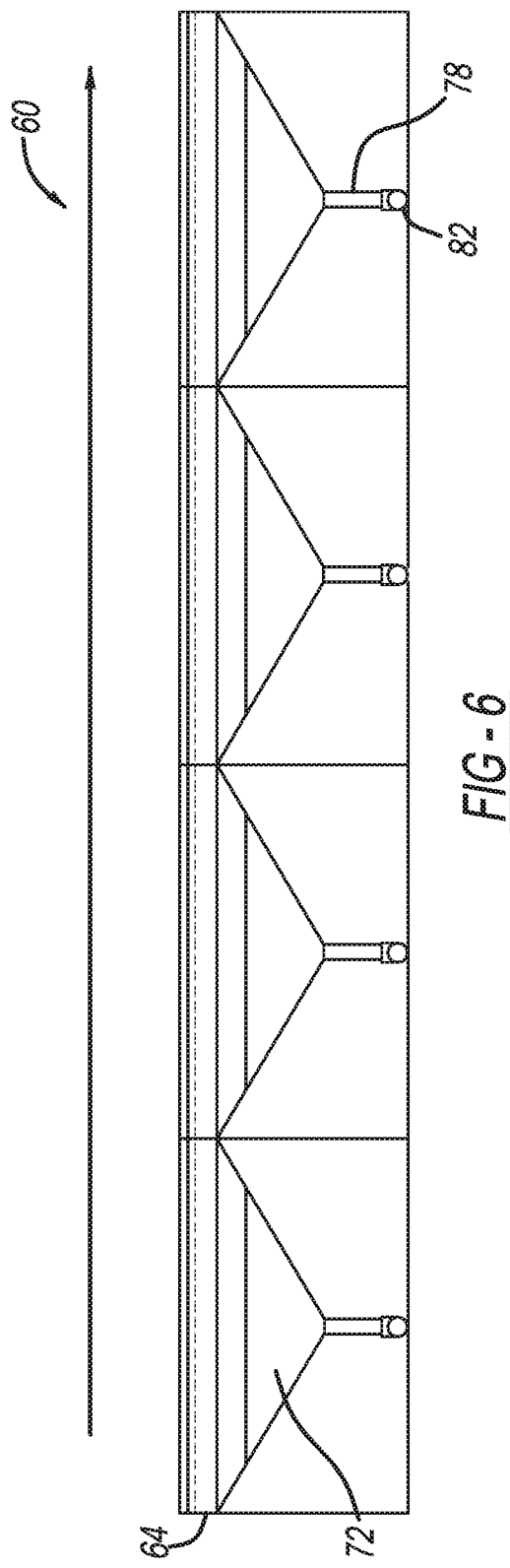
FIG. 6 is a side view of a blasting or stripping booth in accordance with an alternate embodiment.
Figure 7:
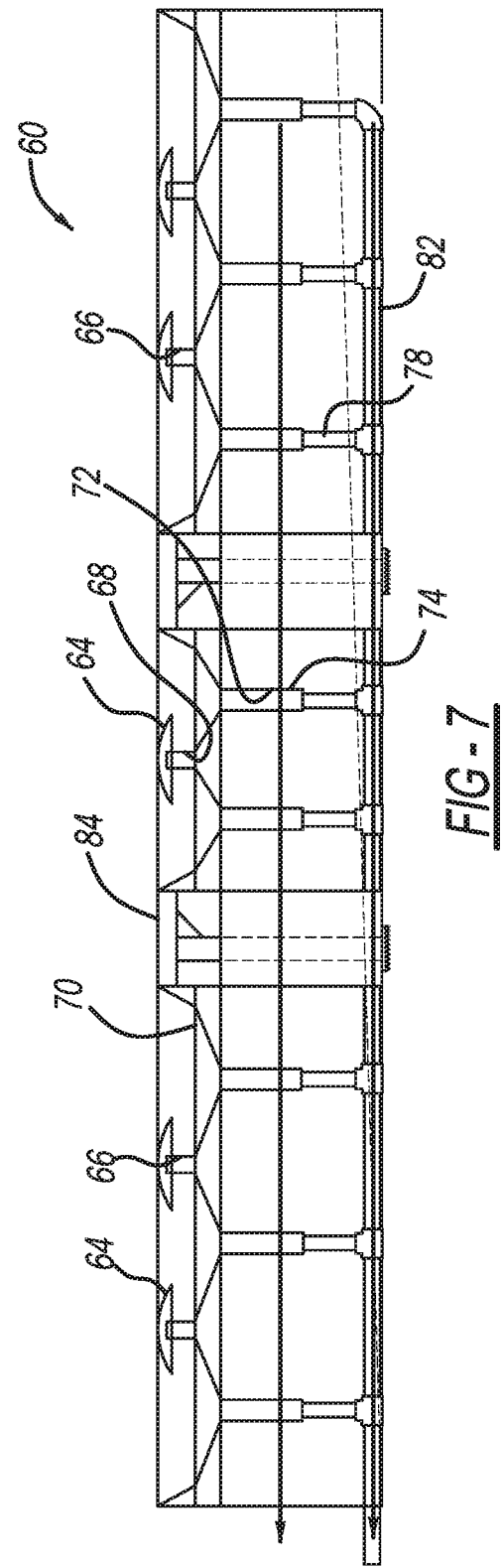
FIG. 7 is a front view of a blasting or stripping booth in accordance with an alternate embodiment.

Referring particularly to FIG. 5, the airflow and particle flow of the alternate embodiment of a separator assembly 60 is shown. FIGS. 5-7 show only the separator assembly 60 and not the upper region 12 of the booth. Referring to FIGS. 6 and 7, a number of separator assemblies 60 are also arranged generally in a rectangular array configuration. FIG. 6 is a side view of an array of separator assemblies 60 showing that the separate separator assemblies are arranged in a linear manner along a conveyor direction shown in the figure. Reference here is made to a conveyor since this embodiment is especially well suited for industrial applications incorporating an elongated blasting or stripping booth through which parts are conveyed in a serial manner. FIG. 7 is a front view showing a number of separator assemblies 60 arranged to join laterally.

For separator assembly 60, rather than a conical shaped baffles as in the first embodiment, elongated baffles 64 are provided. Baffles 64 cover a narrow slot 66 formed by closely spaced walls forming channel 68. Adjacent to slot 66, funnel walls 70 are provided which converge to lower slot 72 formed by closely spaced parallel walls 74. Funnel walls 70 of adjacent separator elements meet to form the upwardly facing extending slot 66. As best shown in FIG. 6, slot 72 and walls 74 form a first passageway which converges to meet at solids pipe 78. With this configuration, a mixture with a high concentration of solids is directed to collect into slot 72 and is then directed to flow into air/solids pipe 82. Slot 66 which is an entrance of a second passageway is formed at adjoining funnel walls 70 of funnel walls which are stretched along a line.

Separator assembly 60 operates in a manner similar to that of separator assembly 16. As shown in FIGS. 6 and 7, a plurality of individual separator assemblies 60 are arranged as shown. As mentioned previously, the upper portion of booth 10 is not shown by these figures. In addition to the elongated configuration of separator assembly 60, another difference with the first embodiment is evident in FIG. 5 which shows that the vertical axes of the flow of high and low concentration streams are laterally offset rather than in a coaxial arrangement as in the first embodiment. As shown in FIG. 5, the mixture with high solids concentration becomes collected within funnel walls 70 which converge at slot 72 forming the first passageway and later are collected from pipes 78 through a manifold arrangement shown in FIG. 7 into a collector solids pipe 82. Referring again to FIG. 5, a low concentration mixture is provided by the tortuous flow pattern required for the fluid/solids mixture to flow initially downwardly from the upper region of blasting booth 68, to flow into the region of funnel walls 70 and then turn direction to move upwardly between the gap formed between baffles 64 and the upstanding walls of slot 66. The low concentration mixture that flows downwardly through slot 66 forming the second passageway and is collected in a plenum connected with adjoining separator elements and is directed to a separator air outlet (not shown) for further processing. This embodiment of separator assembly 60 also differs from the first embodiment in that rather than relying on a partition wall in the lower region of the booth to separate the high and low concentration mixtures, this separator assembly directs the high concentration mixture into pipes 78 and 82.

Figure 8:
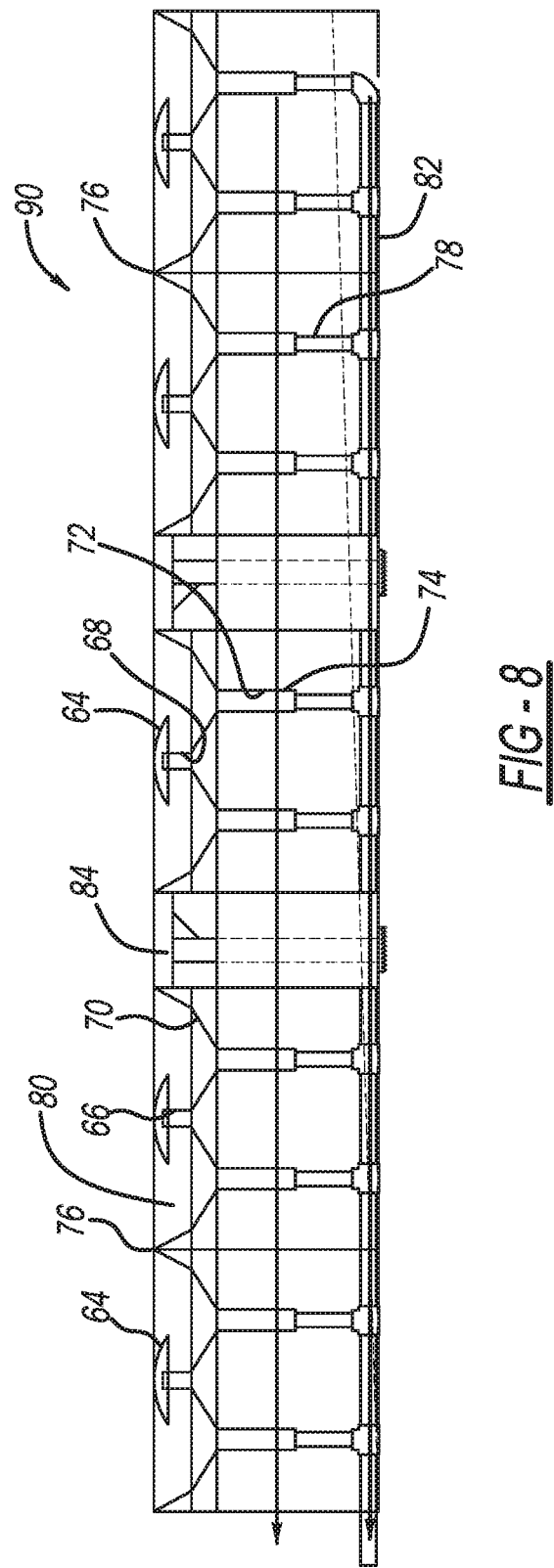
FIG. 8 is a front view of a blasting or stripping booth in accordance with a modification of the alternate embodiment.

Referring to FIG. 8, a further modified version of separator assembly 60 is shown, referred to as separator assembly 90. The difference with this embodiment is that the troughs 80 formed by pairs of funnel walls 70 meet at an edge 76, rather than forming slot 66. Depending on applications, this version may be well suited for some applications without requiring the provision of a baffle 64 at every junction between adjacent pairs of troughs 80.

The embodiment of separator assemblies 60 and 90 in accordance with the second embodiment are well adapted for industrial operations involving a linearly moving a conveyor since that is well suited for an elongated configuration. Moreover, there may be fabrication cost advantages for separator assembly 60 with elongated components have been a constant cross-section rather than using tubular parts such as pipes.

In the case of separator assemblies 60 and 90 as shown by the figures structural beam elements 84 are shown for supporting the separator units and associated structure. Structural elements 84 also support equipment, operators, workpieces and a support grating, etc.

Figure 9:
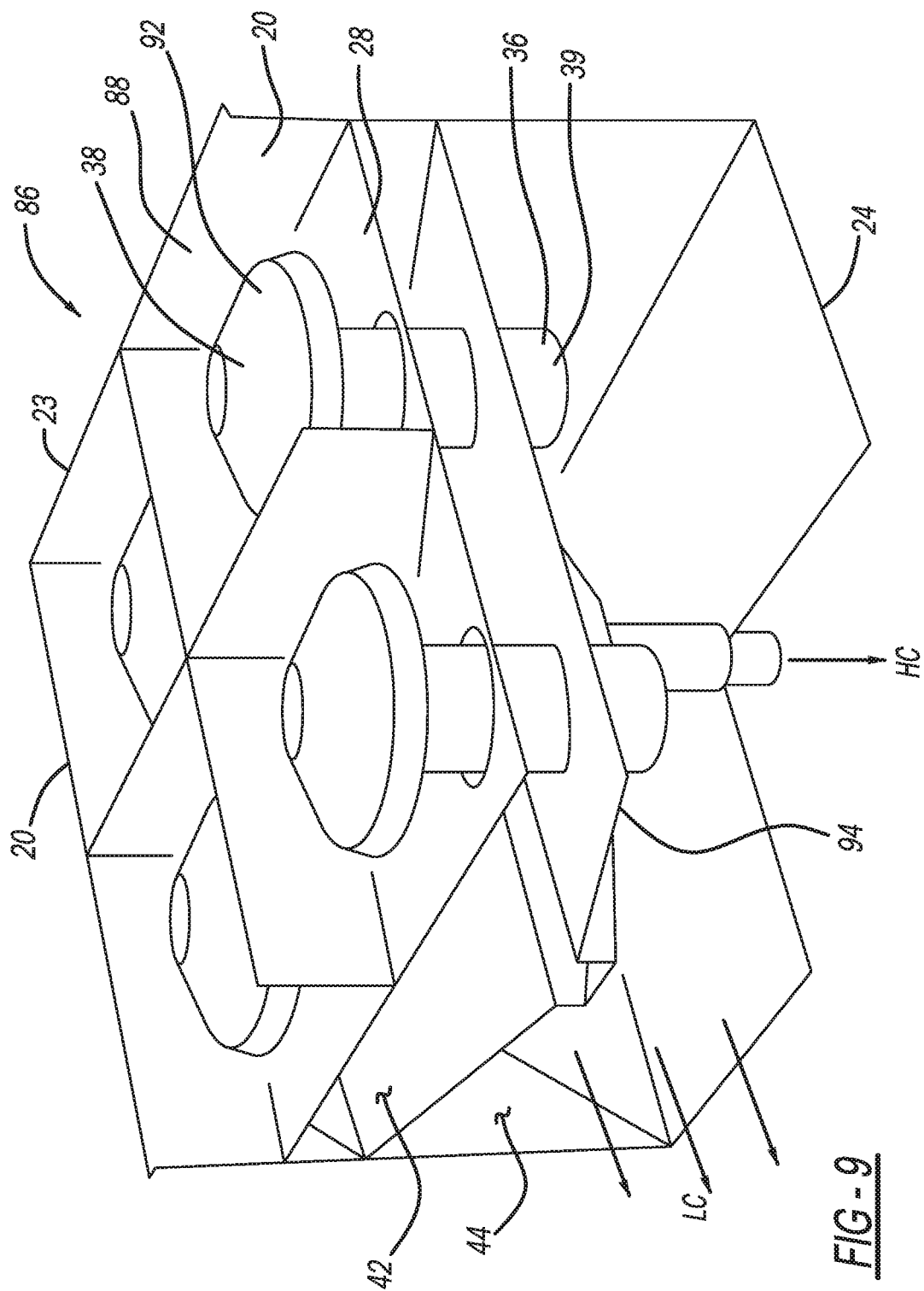
FIG. 9 is a pictorial illustration of a further alternate embodiment of the separator assembly.

FIG. 9 illustrates a still further embodiment of the present invention. This embodiment of separator assembly 86 utilizes elements from the prior embodiments, which are identified by like reference numbers. Separator assembly 86 uses a grate like plate 88 forming separator walls 20-23 dividing discrete separator units 92. The lower surface of baffles 88 form funnel walls 28 with a concentric pipe 36 extending therethrough. Baffles 38 are positioned over the pipe upper end 37. As in prior embodiments, two distinct flow paths are provided. A high solids concentration mixture falls through annular passageway 41 and into upper chamber 42. In this case, upper chamber 42 is formed by a separator plate 94. A low solids concentration stream flows upward into and down through pipes 36 into a lower plenum area.

Figure 10:
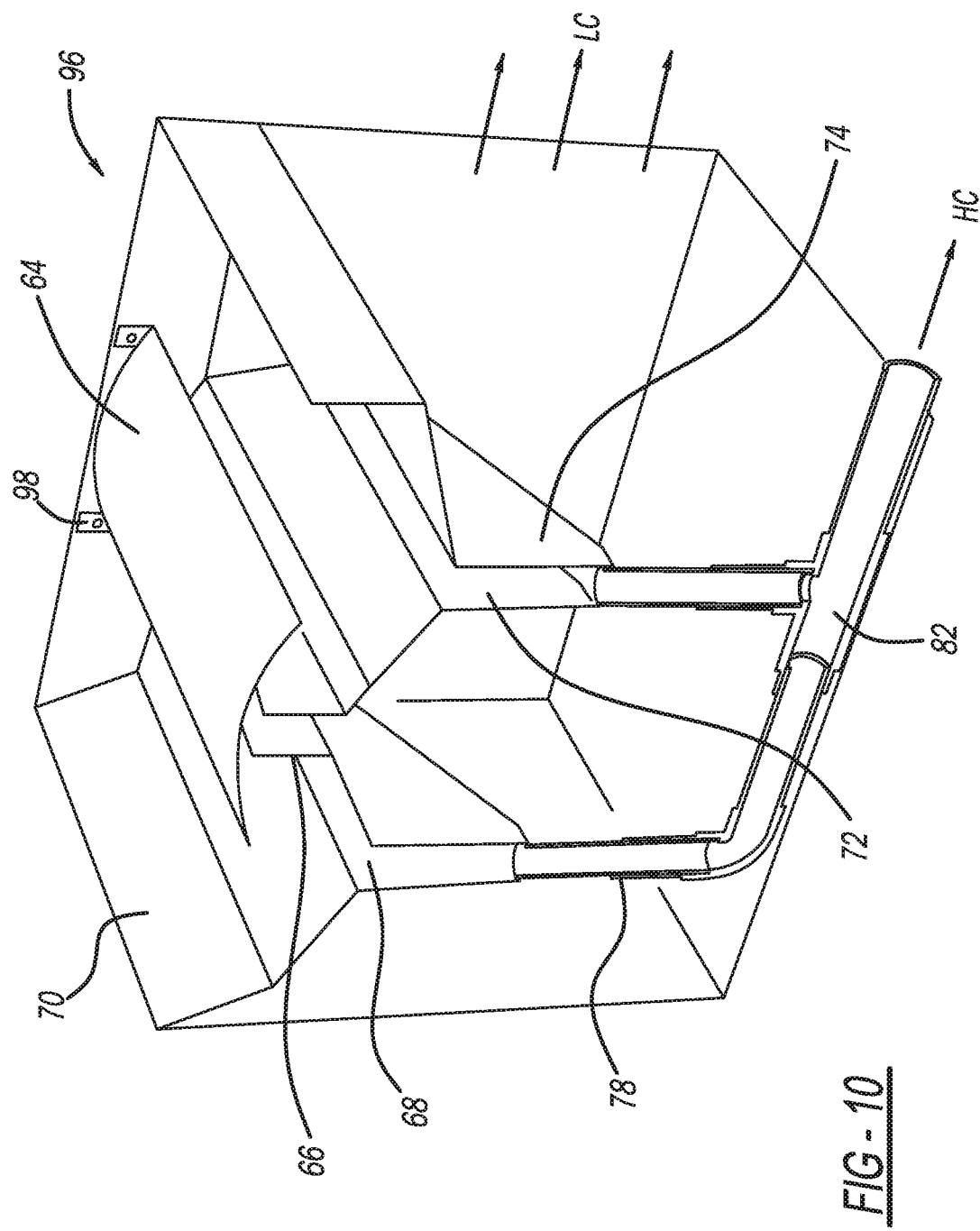
FIG. 10 is a pictorial illustration of a further alternate embodiment of a separator assembly.

A still further embodiment of separator assembly 96 is shown in FIG. 10. Separator assembly 96 is very similar to the design illustrated in FIG. 8. In this alternate configuration of separator assemblies 16 and 90 the various pipe elements may be replaced by passageways formed by sheet metal elements to provide the same function as pipes. Such embodiments are described in the following description. The embodiment of FIG. 10 also illustrates attachment brackets 98 which support baffle 64. Adjustment brackets 98 permit the position of baffle 64 relative to the upper edge of slot 66 to be adjusted. This will have the effect of changing the flow restrictions of the second passageway for the low solids concentration stream. This will enable a balancing of the flow rates for the high and low concentration streams to be provided. Other mechanisms and attachments for the baffles described throughout this description may be provided for a similar balancing adjustment. Here, elongated baffles 64 are placed over sheet metal elements forming slot 66. The high solids air/particle mixture is transmitted in this case through pipes 78 and 82. This figure provides a conceptual model of the operation of the device equivalent to that previously described.

In FIG. 10 funnel wall 70 is shown having surfaces formed of planar segments joining together along break lines with differing angles. Alternate configurations can have a funnel wall with a surface forming a single planar angle or curved surfaces may be used as desired.

Figure 11:
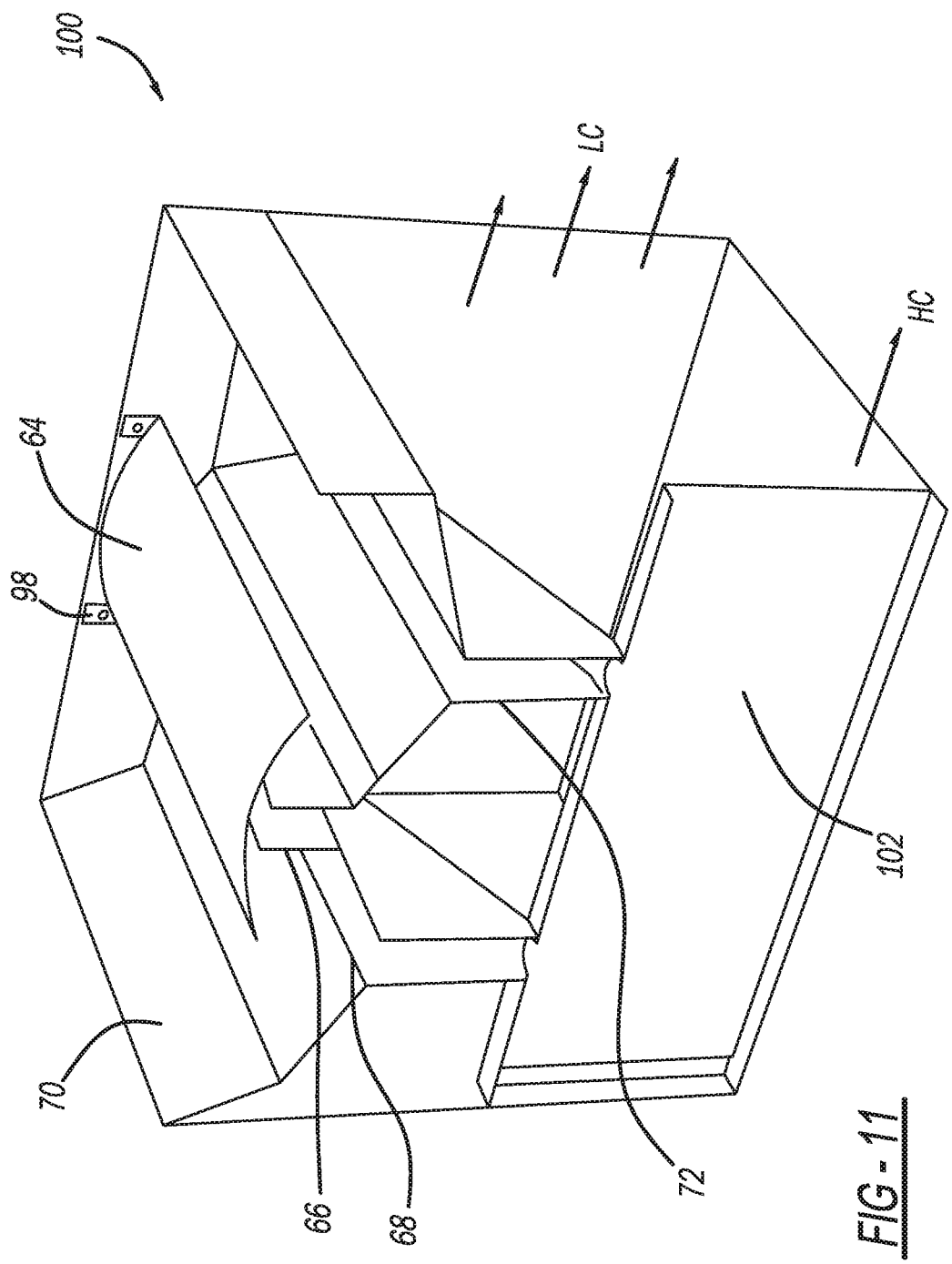
FIG. 11 is a pictorial illustration of a further alternate embodiment of a separator assembly.

FIG. 11 provides an embodiment of separator assembly 100 equivalent in operation to separator assembly 96, except in this case, the functions of pipes 78 and 82 are provided by sheet metal ducts including panel 102 which together with other associated panel structures form a conduit for the flow of the high solids fluid mixture.

Figure 12:
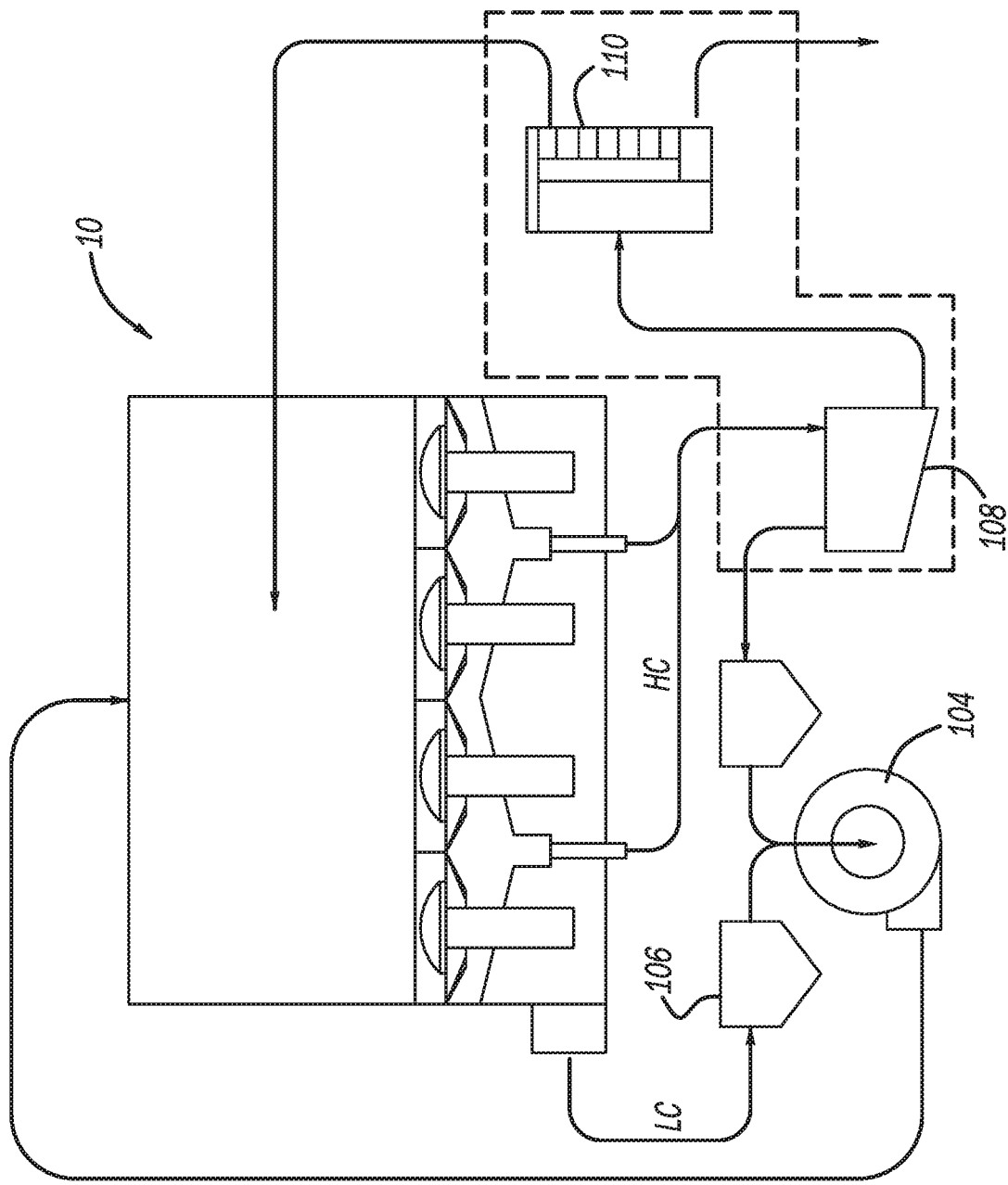
FIG. 12 is a flow schematic showing a system using a separator assembly in accordance with the present invention.

FIG. 12 provides a flow schematic of the use of any of the separator elements previously described in a stripping or blasting system. FIG. 12 illustrates the flow of fluids and solids to the system and illustrates a closed loop reclamation system for the beads and a system for consolidating debris for rejection and disposal. As shown overall airflow is driven by fan 104. The low concentration stream flows through filter 106. The high concentration stream is first directed to settling tank 108 and then to classification device 110. From classification device 110 there is a reject flow and a recycle flow shown being directed back to booth 10. These latter components part of a reclaim system enclosed by the dotted lines in the figure. The reclaim schematics shown is for illustration purposes, other methods can be used to separate debris from beads such as cyclones, fluidized beds, sieves, etc. The present invention should is not limited by the method used to separate the debris from the recycled/ reclaimed beads.

Figure 13:
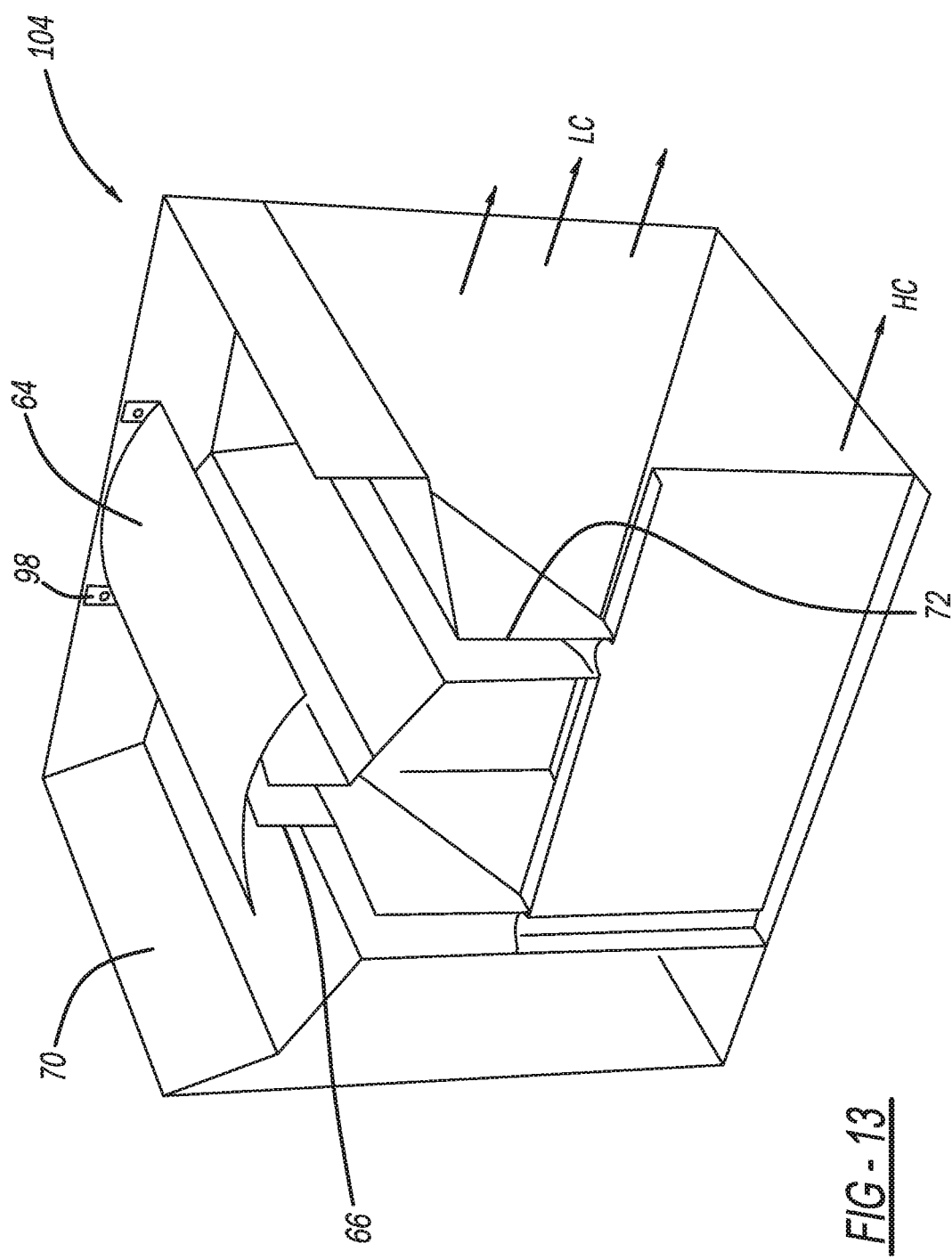
FIG. 13 is a pictorial illustration of a further alternate embodiment of a separator assembly.
Figure 14:
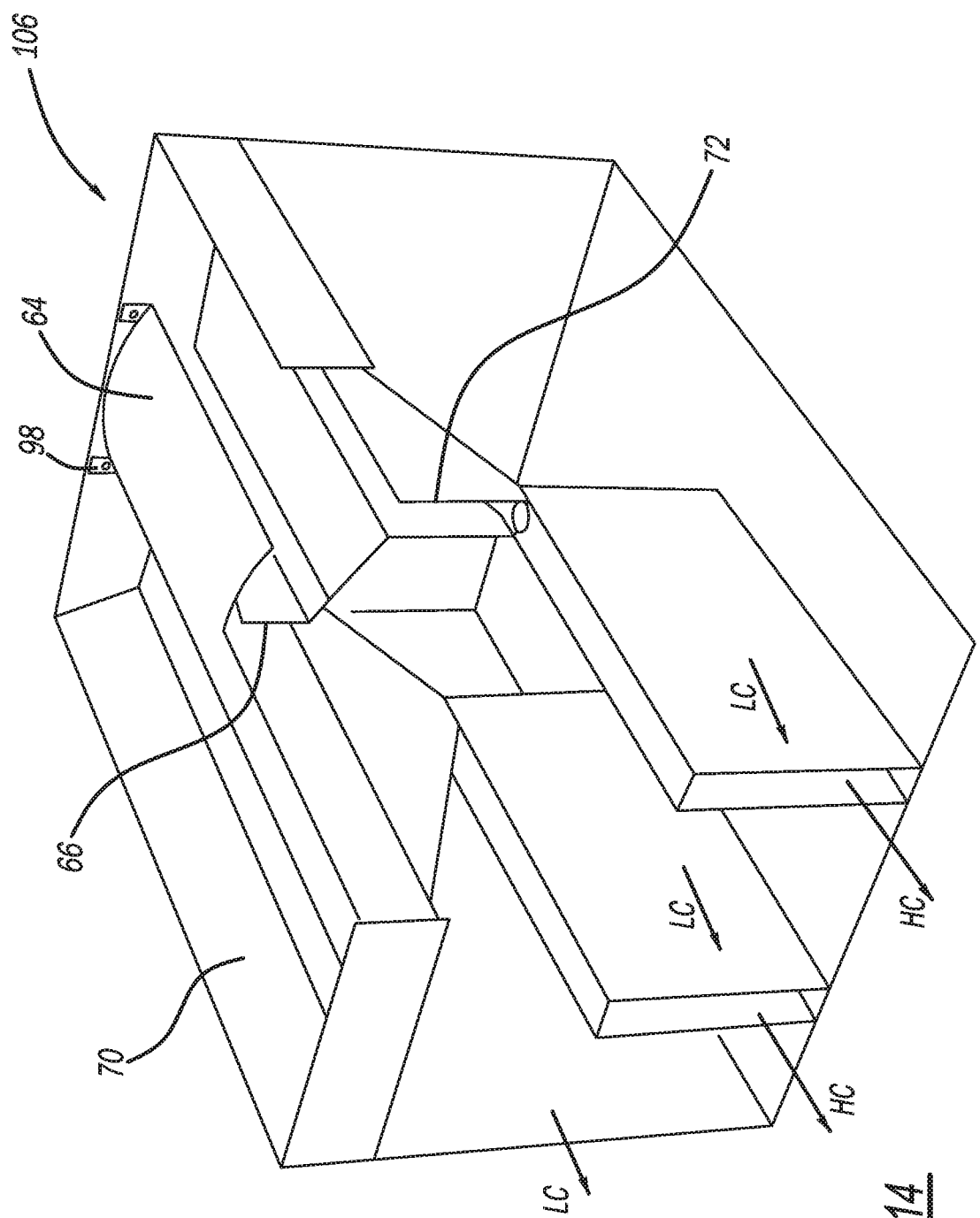
FIG. 14 is a pictorial illustration of a further alternate embodiment of the separator assembly.

FIGS. 13 and 14 provide pictorial depictions of separator assemblies 104 and 106 showing features similar to prior embodiments which shares the feature of separator assembly 100 in that separate pipe type fluid flow elements are eliminated in favor of ducts formed from sheet metal components. The difference between FIGS. 13 and 14 is the direction of the high concentration and low concentration airflows. In FIG. 13, they run perpendicular to the lengthwise symmetry of the device, while in FIG. 14 these airflows run parallel to the lengthwise symmetry of the device. This highlights a good balance between simplicity of the device and flexibility in the arrangement of its components which helps adapting it to different application scenarios.

For any of the described embodiments it is necessary to design the flow areas for the fluid stream areas of the first and second passageways to provide a proper flow rate balance between the high and low solids concentration streams. An example of such design considerations is described with reference to the first embodiment. The flow stream through booth 10 is driven by a pressure differential between upper region 12 and the lower region 14 of blasting booth 10. The flow area through the annular passageway 41 in the first embodiment must not permit a free flow of the untreated stream through the device exiting through the annular passageway, which would result in poor separation efficiency. Instead the annular passageway flow area needs to be restricted to develop sufficient pressure differential to drive a secondary flow stream described previously which will move initially downwardly and then upwardly around baffle 38, which becomes the low solids concentration stream. If flow restrictions for the high solids concentration stream is too great, this flow path will essentially become "plugged" which will drive an excess flow rate through the inside of pipe 36 and the low solids concentration stream will have an excess solids concentration. This balancing principle it is applicable in each of the embodiments described previously. The precise relationships of flow areas and flow configurations are dependent upon numerous factors including beads and debris concentration flow rate requirements installation constraints etc. and cannot be defined here for every application. One mechanism for providing the balancing is mentioned previously with adjustments of baffle position which can influence the flow restrictions through the second passageway.

The separator assemblies described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

We claim:

1. A blasting or stripping booth for processing a workpiece with a stream mixture of air and a blasting media producing debris upon impingement of the stream mixture with the workpiece, comprising,
    an enclosure defining an upper region for the workpiece, and a lower region,
    a fan communicating with the enclosure and creating a pressure difference and a flow of the stream mixture between the upper region and the lower region in a generally vertical downward direction,
    a separator assembly positioned between the upper region and the lower region, the separator assembly adapted to receive the stream mixture and the debris and provide a high solids concentration stream composed of air and a high concentration of the blasting media and the debris, and a low solids concentration stream composed of air and a low concentration of the blasting media and the debris,
    the separator assembly having a plurality of separator elements combined into an array, a first of the separator elements comprising a first funnel wall defining a first portion of an upper inlet and converging to form a first portion of a lower aperture the upper inlet positioned above the lower aperture, a second funnel wall defining a second portion of the upper inlet and converging to form a second portion of the lower aperture, the lower aperture communicating with a first passageway, the upper inlet communicating with a second passageway and a baffle positioned over the upper inlet and spaced from the funnel wall upper inlet whereby the upper inlet is substantially unobstructed, the pressure difference driving the stream mixture to flow from the upper region to the lower region, wherein the stream mixture and the debris are separated to create two flow paths, the two flow paths comprising a first flow path of the stream mixture and the debris which flows generally downwardly through the lower aperture and through the first passageway creating the high solids concentration stream, and a second flow path of the stream mixture and the debris enters upper inlet and the second passageway creating the low solids concentration stream.

2. The blasting or stripping booth in accordance with claim 1 further comprising, the enclosure lower region forming an upper chamber communicating with the first passageway for receiving the high solids concentration stream and a lower chamber communicating with the second passageway receiving the low solids concentration stream.

3. The blasting or stripping booth in accordance with claim 1 further comprising, adjacent ones of the plurality of separator elements joining along a common edge of the funnel wall upper inlet.

4. The blasting or stripping booth in accordance with claim 1, further comprising, the funnel wall lower aperture is circular and a tubular element communicates with the lower aperture to form a portion of the second passageway.

5. The blasting or stripping booth in accordance with claim 1, further comprising, wherein the second portion of the stream mixture and the debris initially flows in a downward direction and then upwardly to enter the upper inlet.

6. The blasting or stripping booth in accordance with claim 1, further comprising, wherein the baffle shields the upper inlet from direct impingement of the stream mixture and the debris with the upper inlet.

7. The blasting or stripping booth in accordance with claim 1, further comprising, the stream mixture flows in a generally vertically downward manner through the enclosure upper end through the separator elements and into the lower end.

8. The blasting or stripping booth in accordance with claim 1, further comprising, an adjustable support for the baffle enabling a gap between the baffle and the upper inlet to be adjusted for controlling a fluid flow rate through the second passageway.

9. The blasting or stripping booth in accordance with claim 1, further comprising, the first and second funnel walls are formed as elongated along a horizontal line with the upper inlet in the form of an elongated trough, the first and second funnel walls are elongated such that the lower aperture is formed as an elongated slot, the baffle in the form of an elongated element covering the upper inlet.

10. The blasting or stripping booth in accordance with claim 1, further comprising, the elongated slot having a converging lower end communicating with a tubular element defining a portion of the first passageway.

11. The blasting or stripping booth in accordance with claim 1, further comprising, the enclosure lower region defining a pair of adjoining first and second plenums, the elongated slot having a converging lower end communicating with the first plenum and the elongated slot communicating with the second plenum, the first and second plenums elongated having a separating wall therebetween.

12. The blasting or stripping booth in accordance with claim 11, further comprising, the separating wall forming an enclosed passageway.

* * * * *